US012311717B2

(12) United States Patent
Ericksen et al.

(10) Patent No.: US 12,311,717 B2
(45) Date of Patent: May 27, 2025

(54) ROUGH ROAD DETECTION

(71) Applicant: Fox Factory, Inc., Duluth, GA (US)

(72) Inventors: Everet Owen Ericksen, Woodland, CA (US); Andrew Diao, Santa Cruz, CA (US); Mike Fraguglia, Meadow Vista, CA (US); Evan Peterson, Santa Cruz, CA (US); James T. Pickett, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/383,298

(22) Filed: Oct. 24, 2023

(65) Prior Publication Data

US 2024/0227485 A1 Jul. 11, 2024

Related U.S. Application Data

(63) Continuation of application No. 17/374,895, filed on Jul. 13, 2021, now Pat. No. 11,833,876.
(Continued)

(51) Int. Cl.
*B60G 17/0165* (2006.01)
*B60G 17/019* (2006.01)
(Continued)

(52) U.S. Cl.
CPC ... *B60G 17/0165* (2013.01); *B60G 17/01908* (2013.01); *B60G 17/08* (2013.01);
(Continued)

(58) Field of Classification Search
CPC .......... B60G 17/0165; B60G 17/01908; B60G 17/08; B60G 2300/12; B60G 2500/104;
(Continued)

(56) References Cited

U.S. PATENT DOCUMENTS

| 3,986,118 A | 10/1976 | Madigan |
| 5,632,503 A | 5/1997 | Raad et al. |

(Continued)

FOREIGN PATENT DOCUMENTS

| DE | 102015107738 A1 | 11/2016 |
| EP | 0556070 A2 | 8/1993 |

(Continued)

OTHER PUBLICATIONS

European Examination Report for EP Application No. 21185925.1, 8 pages, Mailed Sep. 8, 2022.
(Continued)

*Primary Examiner* — Toan C To

(57) ABSTRACT

A rough road detection system is disclosed. The system includes a sensor data receiver to receive sensor data from one or more sensors monitoring a vehicle. A sensor data evaluator to: identify a repeating pattern in the sensor data, the repeating pattern indicative of a terrain type being traversed by the vehicle, determine a value of the repeating pattern, obtain a present set of operational values for at least one damping characteristic of an active valve damper coupled with the vehicle, and modify the present set of operational values for the at least one damping characteristic of the active valve damper based on the value of the repeating pattern to develop a modified set of operational values for the at least one damping characteristic of the active valve damper.

14 Claims, 8 Drawing Sheets

Related U.S. Application Data

(60) Provisional application No. 63/052,892, filed on Jul. 16, 2020, provisional application No. 63/052,291, filed on Jul. 15, 2020.

(51) Int. Cl.
  *B60G 17/08* (2006.01)
  *B62J 45/414* (2020.01)
  *B62K 25/04* (2006.01)

(52) U.S. Cl.
  CPC ............ *B62J 45/414* (2020.02); *B62K 25/04* (2013.01); *B60G 2300/12* (2013.01); *B60G 2500/104* (2013.01); *B62K 2025/044* (2013.01)

(58) Field of Classification Search
  CPC ... B62J 45/414; B62K 25/04; B62K 2025/044
  See application file for complete search history.

(56) References Cited

U.S. PATENT DOCUMENTS

| | | | |
|---|---|---|---|
| 5,638,275 | A | 6/1997 | Sasaki et al. |
| 5,952,823 | A | 9/1999 | Sprecher et al. |
| 6,202,011 | B1 | 3/2001 | Jeon |
| 6,260,859 | B1 | 7/2001 | Dixon et al. |
| 6,294,891 | B1 | 9/2001 | McConnell et al. |
| 6,654,697 | B1 | 11/2003 | Eryurek et al. |
| 7,374,028 | B2 | 5/2008 | Fox |
| 7,484,603 | B2 | 2/2009 | Fox |
| 8,322,728 | B2 | 12/2012 | Hirao et al. |
| 8,627,932 | B2 | 1/2014 | Marking |
| 8,838,335 | B2 | 9/2014 | Bass et al. |
| 8,857,580 | B2 | 10/2014 | Marking |
| 8,886,403 | B2 * | 11/2014 | Battlogg ............... B62K 25/04 702/116 |
| 8,955,653 | B2 | 2/2015 | Marking |
| 8,989,963 | B1 | 3/2015 | Yellambalase et al. |
| 9,033,122 | B2 | 5/2015 | Ericksen et al. |
| 9,120,362 | B2 | 9/2015 | Marking |
| 9,199,690 | B2 * | 12/2015 | Watarai ............... B62K 25/04 |
| 9,239,090 | B2 | 1/2016 | Marking et al. |
| 9,303,712 | B2 | 4/2016 | Cox |
| 9,353,818 | B2 | 5/2016 | Marking |
| 9,527,363 | B2 | 12/2016 | Bennett |
| 9,662,954 | B2 * | 5/2017 | Brady ................ B60G 17/016 |
| 10,060,499 | B2 | 8/2018 | Ericksen et al. |
| 10,173,489 | B2 | 1/2019 | Miska et al. |
| 10,443,671 | B2 | 10/2019 | Marking |
| 10,737,546 | B2 | 8/2020 | Tong |
| 10,807,670 | B2 * | 10/2020 | Krugman ............ F16F 9/3292 |
| 11,305,603 | B2 * | 4/2022 | Kubota ................. B60G 15/12 |
| 11,459,050 | B2 * | 10/2022 | Allinger ................ B62J 50/22 |
| 11,712,940 | B2 * | 8/2023 | Murakami ............ F16F 9/512 701/37 |
| 11,713,093 | B2 * | 8/2023 | Ericksen ............... B60G 21/08 280/124.157 |
| 11,718,137 | B2 * | 8/2023 | D'Orazio .............. F16F 9/56 280/5.514 |
| 2006/0064223 | A1 | 3/2006 | Voss |
| 2007/0095130 | A1 | 5/2007 | Assaf et al. |
| 2009/0076673 | A1 | 3/2009 | Brabec |
| 2009/0192673 | A1 | 7/2009 | Song et al. |
| 2011/0202236 | A1 | 8/2011 | Galasso et al. |
| 2012/0268294 | A1 | 10/2012 | Michaelis et al. |
| 2013/0054091 | A1 | 2/2013 | Leclerc et al. |
| 2013/0060423 | A1 | 3/2013 | Jolly |
| 2013/0144489 | A1 | 6/2013 | Galasso et al. |
| 2013/0292218 | A1 * | 11/2013 | Ericksen ............... F16F 9/5126 188/266.2 |
| 2014/0303844 | A1 | 10/2014 | Hoffmann et al. |
| 2014/0316652 | A1 | 10/2014 | Ericksen et al. |
| 2015/0314663 | A1 | 11/2015 | Rhode et al. |
| 2016/0288866 | A1 | 10/2016 | Toda |
| 2018/0141543 | A1 | 5/2018 | Krosschell et al. |
| 2018/0339566 | A1 | 11/2018 | Ericksen et al. |
| 2019/0315432 | A1 | 10/2019 | Böckmann |
| 2020/0055363 | A1 | 2/2020 | Paiva et al. |
| 2020/0324848 | A1 | 10/2020 | Weagle |
| 2021/0061405 | A1 | 3/2021 | Ericksen et al. |
| 2021/0065467 | A1 | 3/2021 | Allinger et al. |
| 2021/0155313 | A1 | 5/2021 | Ericksen et al. |
| 2021/0178845 | A1 | 6/2021 | Cho et al. |
| 2021/0214040 | A1 | 7/2021 | Shahana |
| 2021/0225097 | A1 | 7/2021 | Bou Daher et al. |
| 2021/0309063 | A1 | 10/2021 | Negishi et al. |
| 2021/0309064 | A1 | 10/2021 | Negishi et al. |
| 2021/0319214 | A1 | 10/2021 | Lee et al. |
| 2022/0016950 | A1 | 1/2022 | Ericksen et al. |
| 2022/0025954 | A1 | 1/2022 | Pickett et al. |
| 2022/0111695 | A1 | 4/2022 | Furuta |
| 2022/0177071 | A1 | 6/2022 | Voss |
| 2022/0194161 | A1 | 6/2022 | Negishi et al. |
| 2022/0204121 | A1 | 6/2022 | Ericksen et al. |
| 2022/0266939 | A1 | 8/2022 | Ericksen et al. |

FOREIGN PATENT DOCUMENTS

| | | |
|---|---|---|
| EP | 2357098 A2 | 8/2011 |
| EP | 2858840 A1 | 4/2015 |
| EP | 2939857 B1 | 6/2021 |
| EP | 3939812 A1 | 1/2022 |
| EP | 3939813 A1 | 1/2022 |

OTHER PUBLICATIONS

European Search Report for European Application No. 21185925.1, 9 pages, Dec. 14, 2021.

European Search Report for European Application No. 21185944.2, 9 pages, Dec. 9, 2021.

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

Hemminki, et al., "Accelerometer-Based Transportation Mode Detection on Smartphones", SenSys '13: Proceedings of the 11th ACM Conference on Embedded Networked Sensor Systems, Article No. 13, Nov. 11, 2013, 14 Pages.

Hoffmann, et al., "Road-quality classification and bump detection with bicycle-mounted smartphones", UDM'13: Proceedings of the 3rd International Conference on Ubiquitous Data Mining—vol. 1088, Aug. 3, 2013, 5 Pages.

Jitpakdee, et al., "Neural networks terrain classification using Inertial Measurement Unit for an autonomous vehicle", 2008 SICE Annual Conference, Aug. 20-22, 2008, 5 Pages.

Lawoyin, et al., "Accelerometer-based steering-wheel movement monitoring for drowsy-driving detection.", Proceedings of the Institution of Mechanical Engineers, Part D: Journal of Automobile Engineering., 2015, pp. 163-173.

Liu, et al., "On-line Estimation of Road Profile in Semi-Active Suspension based on Unsprung Mass Acceleration", 2019, 22 Pages Prusty, et al., "A Machine Learning Based Approach for Classification of Road Surfaces", Apr. 30, 2023, 6 Pages.

Wang, et al., "Road-Terrain Classification for Land Vehicles: Employing an Acceleration-Based Approach", IEEE Vehicular Technology Magazine, vol. 12, No. 3, Sep. 2017, pp. 34-41.

Weiss, et al., "Vibration-based Terrain Classification Using Support Vector Machines", EEE/RSJ International Conference on Intelligent Robots and Systems, Beijing, China, 2006, pp. 4429-4434.

* cited by examiner

ROUGH ROAD DETECTION

CROSS-REFERENCE TO RELATED APPLICATIONS

This application is a Continuation of and claims priority to and benefit of co-pending U.S. patent application Ser. No. 17/374,895 filed on Jul. 13, 2021, entitled "ROUGH ROAD DETECTION" by Ericksen et al., and assigned to the assignee of the present application, the disclosure of which is hereby incorporated by reference in its entirety.

The application Ser. No. 17/374,895 claims priority to and benefit of U.S. Provisional Patent Application No. 63/052,892 filed on Jul. 16, 2020, entitled "ROUGH ROAD DETECTION" by Ericksen et al., and assigned to the assignee of the present application, the disclosure of which is hereby incorporated by reference in its entirety.

The application Ser. No. 17/374,895 claims priority to and benefit of U.S. Provisional Patent Application No. 63/052,291 filed on Jul. 15, 2020, entitled "ACTIVE VALVE CUSTOMIZABLE TUNE APPLICATION" by Pickett et al., and assigned to the assignee of the present application, the disclosure of which is hereby incorporated by reference in its entirety.

FIELD OF THE INVENTION

Embodiments of the present technology relate generally to an active or semi active suspension.

BACKGROUND

Vehicle suspension systems typically include a spring component or components and a damping component or components that form a suspension to provide for a comfortable ride, enhance performance of a vehicle, and the like. For example, a firmer suspension is usually preferred on smooth terrain while a softer suspension is often the choice for an off-road environment. However, the suspension system is almost always a collection of compromises to obtain the "best" performance over a range of different possible encounters.

BRIEF DESCRIPTION OF THE DRAWINGS

Aspects of the present invention are illustrated by way of example, and not by way of limitation, in the accompanying drawings, wherein.

Figure 1A:
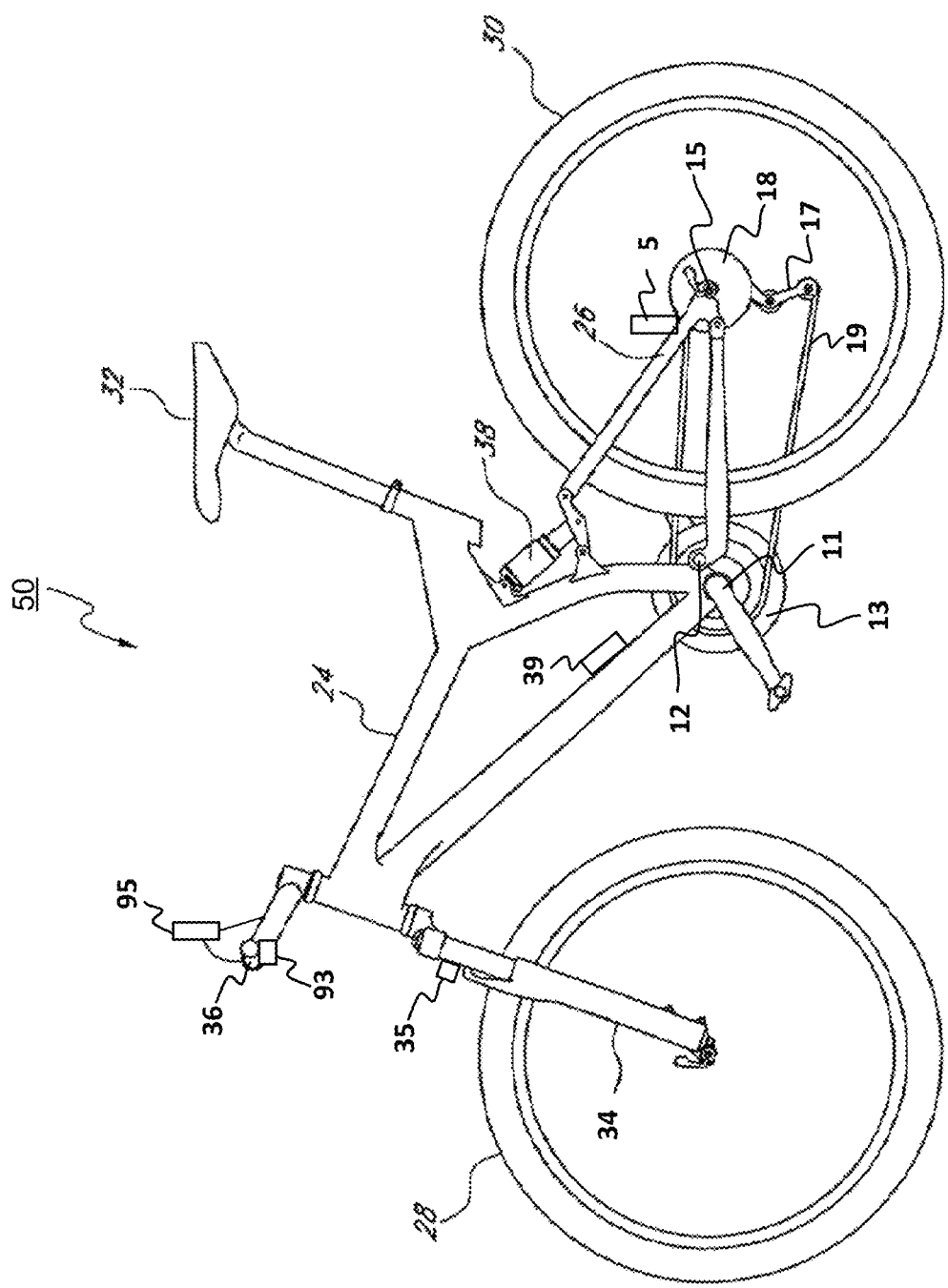
FIG. 1A is a schematic side view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

For purposes of the following discussion, power spectral density refers to a form of data such as frequency, amplitude, time, location (e.g., GPS location), or a combination thereof. This data can be used in a graph, a surface, or an algorithm to establish damper settings (e.g., suspension settings) that are associated with a given power spectral density.

In the following discussion, terrain type refers to the terrain being traversed by the vehicle. The terrain could be paved, concrete, matting, grass, dirt, gravel, mud, rocky, sandy, smooth, rough, etc. For purposes of clarity, in the following discussion the term "road", "trail", or the like are used to identify the path being traversed by the vehicle and, on their own, are not indicative of the terrain that makes up the "road" or "trail". For example, a road (or trail, path, etc.) could paved, concrete, matting, grass, dirt, gravel, mud, rocky, sandy, smooth, rough, and the like.

The term "gravel road" refers to a road that has a number of gravel media such as pebbles, rocks, or the like mixed therein. In one embodiment, the media is embedded into the ground. In one embodiment, the media is mixed into the road surface for erosion control, to make the road surface more durable, are uncovered as the road is used, and the like. In one embodiment, the media is approximately 1 inch or less in size. However, in another embodiment, the media is approximately 2 inches or less in size.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

In the following discussion, and for purposes of clarity, a bicycle is utilized as the example vehicle. However, in another embodiment, the vehicle could be on any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, or the like. In general, a motorized bike can include a bike with a combustion motor, an electric bike (e-bike), a hybrid electric and combustion bike, a hybrid motor and pedal powered bike, and the like.

Embodiments described herein provide a new and different system and method to determine when a suspension change is warranted based on a terrain type being traversed by the vehicle. In one embodiment, the following discussion provides a novel way of integrating active vehicle suspension into rough terrain detection, smooth terrain detection, changes in the terrain being crossed, and the like.

One embodiment uses an accelerometer (aka a bump sensor) attached to the front and rear wheels that senses the bumps encountered by the bike—essentially reading the terrain. In one embodiment, the motion is determined by a different sensor type. The goal is to discern if the bike is experiencing bumpy or smooth terrain and then change the suspension characteristics accordingly. On smooth terrain, the suspension is in the firm mode. In bumpy terrain, the suspension is in the soft mode. Generally, this works well as the bump sensor gives low readings in smooth terrain. When a rock or tree root (for example) is encountered by the front wheel, we see a large spike in acceleration which is a trigger to switch to the soft-suspension setting.

One type of terrain that presents difficulty with this approach is the gravel road. This surface has small pebbles imbedded into the ground and is very common for erosion control and road surface durability. From a bump sensor standpoint, the acceleration caused when the wheels are rolling over these pebbles is relatively high. In one embodiment, at a high enough bike speed, the acceleration derived from these bumps by a bump sensor is sufficient to exceed the bump threshold and trigger a suspension change. However, in reality, there is not enough energy within the gravel road to require a suspension change. Thus, even though the acceleration threshold is met, it would be better for the suspension to remain in the firm setting.

FIG. 1A is a schematic side view of a bicycle 50 in accordance with an embodiment. Although a bicycle 50 is used in the discussion. In one embodiment, the vehicle could be a different vehicle such as an e-bike, a motorcycle, ATV, jet ski, car, snow mobile, side-by-side, watercraft, and the like. Thus, the system could be used in a suspension damper on a number of different vehicles (and in one or more different locations on the number of different vehicles). In one embodiment, the semi-active damping system could be used in one or more dampers in suspension systems for wheel, frame, seat, steering, or any other component that utilizes a damper.

Bicycle 50 has a frame 24 with a suspension system comprising a swing arm 26 that, in use, is able to move relative to the rest of frame 24; this movement is permitted by, inter alia, active valve damper 38. The front fork 34 also provide a suspension function via a damping assembly in at least one fork leg; as such the bicycle 50 is a full suspension bicycle (such as an ATB or mountain bike). However, the embodiments described herein are not limited to use on full suspension bicycles. In particular, the term "suspension system" is intended to include vehicles having front suspension only, rear suspension only, seat suspension only, other components with a damper of some type, a combination of two or more different suspensions, and the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the location of pivot point 12 herein is provided as one embodiment of the location. Bottom bracket axis 11 is the center of the pedal and front sprocket assembly 13. Bicycle 50 includes a front wheel 28 which is coupled to the frame 24 via front fork 34 and a rear wheel 30 which is coupled to the frame 24 via swing arm 26. A seat 32 is connected to the frame 24 (in one embodiment via a seat-post) in order to support a rider of the bicycle 50.

The front wheel 28 is supported by a front fork 34 which, in turn, is secured to the frame 24 by a handlebar assembly 36. The rear wheel 30 is connected to the swing arm 26 at rear axle 15. Active valve damper 38 is positioned between the swing arm 26 and the frame 24 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, bicycle 50 includes one or more sensors, connected components, or the like for sensing changes of terrain, bicycle 50 pitch, roll, yaw, speed, acceleration, deceleration, or the like. For example, in one embodiment, a sensor 5 is positioned proximate the rear axle 15 of bicycle 50. In another embodiment, a sensor 35 is positioned proximate to front fork 34. In yet another embodiment, both sensor 5 and sensor 35 are on bicycle 50.

In one embodiment, the angular orientation of the one or more sensors is movable through a given range, thereby allowing alteration of a force component sensed by the sensor in relation to a force (vector) input. In one embodiment, the value for the range is approximately 120°. In one embodiment, the value for the range is approximately 100°. It is understood that the sensor can be moved or mounted in any suitable configuration and allowing for any suitable range of adjustment as may be desirable. That is useful for adjusting the sensitivity of the sensor to various anticipated terrain and bicycle speed conditions (e.g., the bicycle speed affects the vector magnitude of a force input to the bicycle wheel for constant amplitude terrain disparity or "bump/dip." Varying size bumps and dips also affect the vector input angle to the wheel for constant bicycle speed).

In one embodiment, sensor information is obtained from a mobile device 95. Although mobile device 95 is shown mounted to handlebar assembly 36, it should be appreciated that the mobile device 95 could be in a rider's backpack, pocket, or the like and still provide the sense input information.

In general, mobile device 95 is a smart device such as a mobile phone, a smart phone, a tablet, a smart watch, a piece of smart jewelry, smart glasses, or other user portable device(s) having wireless connectivity. Mobile device 95 is capable of broadcasting and receiving via at least one network, such as, but not limited to, WiFi, Cellular, Bluetooth, NFC, and the like. In one embodiment, mobile device 95 includes one or more of a display, a processor, a memory, a GPS, a camera, and the like.

In one embodiment, location information can be provided by the GPS. Further, the location information could be enhanced by the broadcast range of an identified beacon, a WiFi hotspot, overlapped area covered by a plurality of mobile telephone signal providers, or the like. In one embodiment, instead of using GPS information, the location of mobile device 95 is determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 95 enters into or departs from a geofence.

Mobile device 95 includes sensors such as audio, visual, motion, acceleration, altitude, GPS, and the like. In one embodiment, mobile device 95 includes an optional application that operates thereon.

In one embodiment, bicycle 50 includes a switch 93. In one embodiment, switch 93 is a positional switch used in conjunction with the active valve suspension discussed in further detail herein. In one embodiment, switch 93 is a multi-positional switch, an upshift/downshift type of switch, a button type switch, or the like. For example, switch 93 would be a 2-position switch, a 3-position switch, a switch that can cycle through a number of different active valve suspension tunes (similar to a gear shift), or the like.

In one embodiment, switch 93 is wireless. For example, switch 93 would communicate with the mobile device 95 (or other components) via Bluetooth, NFC, WiFi, a hotspot, a cellular network, or any other type of wireless communications.

In one embodiment, switch 93 could be wired and could communicate with mobile device 95 by way of an input port such as USB, micro USB, or any other connectable wired configuration that will allow switch 93 to be communicatively coupled with mobile device 95. In one embodiment, switch 93 could have both wired and wireless communication capabilities.

Although switch 93 is shown mounted to handlebar assembly 36, it should be appreciated that switch 93 could be mounted in a different location on the vehicle, on a mount coupled to the vehicle, or the like. in one embodiment, the location of switch 93 is modifiable and is located on the vehicle based on a rider's preference.

Some or all of components of embodiments herein including sensors, switches, controllers, valves, and the like may be interconnected or connected by wire, wireless, WAN, LAN, Bluetooth, WiFi, ANT, or any suitable power or signal transmitting mechanism.

Figure 1B:
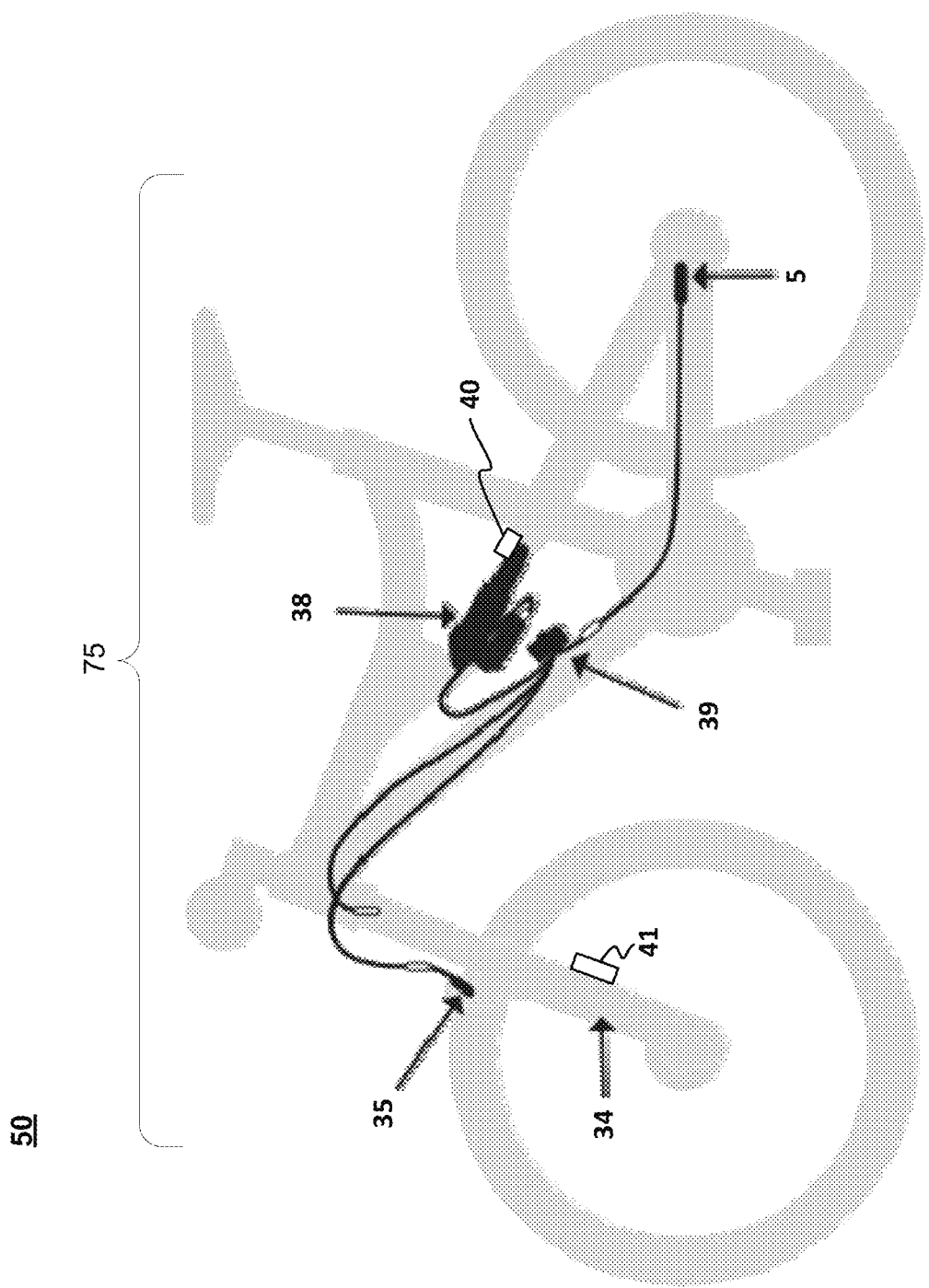
FIG. 1B is a schematic side view of an active valve system on a bicycle, in accordance with an embodiment.

FIG. 1B is a schematic side view of an active valve system 75 on a bicycle having a number of sensors, in accordance with an embodiment. In general, one or more sensors (e.g., sensor 5, 35, 40, and/or 41) are used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

The sensor(s) may be any suitable force or acceleration transducer (e.g. strain gage, Wheatstone bridge, accelerometer, hydraulic, interferometer based, optical, thermal or any suitable combination thereof). The sensor(s) may utilize solid state electronics, electro-mechanical principles or MEMS, or any other suitable mechanisms.

In one embodiment, the one or more of the sensors are a single axis accelerometer, a triaxial accelerometer, a measurement type sensor such as an infrared based time of flight sensor, a radar, 2D and 3D imager, ultrasonic sensor, photoelectric sensor, LiDar, and the like. In one embodiment, the measurement type sensor is a STMicroelectronics sensor and specifically STMicroelectronics sensor model VL53L0X.

In general, a measurement sensor is used to measure distances by projecting a laser light (or sound, etc.) and measuring the reflection. Differences in return times and wavelengths are used to provide distance measurement information. For example, the time of flight sensor mounted on the vehicle is used to measure the distance to the ground in front of the vehicle. In so doing, the time of flight sensor will provide distance data that is used to monitor and detect terrain changes.

In one embodiment, the measurement type sensor continuously and/or repeatedly measures a distance from the sensor to the ground. By monitoring the distance from the sensor to the ground, the measurement type sensor can determine the existence of an upcoming obstacle (e.g., height changes due to holes, bumps, or other obstacles), a shape or abruptness of the obstacle, etc.

For example, in one embodiment, the sensor could be aimed at a point that is approximately 2 feet in front of the bike. In general, by repeatedly measuring the distance from the sensor to the ground in front of the vehicle, any changes in that distance are indicative of an upcoming obstacle.

Although a distance of 2 feet is used in one embodiment, in another embodiment, the distance to the point in front of the bike varies depending upon speed, terrain, and the like. For example, in one embodiment, the distance in front of the bike is defined by user option, factory guidance provided by the damper manufacturer, sensor manufacturer, bike manufacturer, damping system controller manufacturer, or the like.

In operation on a steady surface, the sensor will regularly obtain a time-of-flight of x (plus or minus some nominal value depending upon the type of surface, type of vehicle, the precision/tolerance of the sensor, user or system defined tolerance, or the like). For example, in one embodiment, if a bike with a very tight suspension setup (such as a road bike), is being ridden on a paved road, the nominal value would be slight (e.g., less than a ¼") such that a change in measurement (e.g., a ½" deep pothole) would be larger than the nominal value. In contrast, in one embodiment, if a bike with a suspension setup that is not as tight as the road bike (such as a gravel bike) is being ridden on the road, the nominal value could be larger (e.g., less than 1") such that the change in measurement (e.g., a ½" deep pothole) would not be larger than the nominal value. Furthermore, in one embodiment, if a bike with a longer suspension setup (such as a mountain bike) is being ridden on the road, the nominal value could be even larger (e.g., less than 3") such that the change in measurement (e.g., a 2" deep pothole) would not be larger than the nominal value.

When the sensor obtains a time-of-flight of x+n (where n is a value that is larger than the nominal value) it would mean that a depression (or hole) is detected. Moreover, the size of n would provide information about the depth of the depression, the size of the depression, the geometry (e.g., angle or grade) of the depression, etc.

In contrast, when the sensor obtains a time of flight of x-n, a bump (or rise) is detected. Here, the size of n would provide information about the height of the rise, the size of the rise, the geometry of the rise, etc.

In one embodiment, the n value is preset for the type of active suspension, the terrain type, the vehicle type, the ride type, or the like.

In one embodiment, the sensors of active valve system 75 provide the obtained sensor data to a suspension controller 39 which uses the sensor data to monitor the terrain and make suspension adjustments. In one embodiment, suspension controller 39 makes suspension adjustments to active valve damper 38, a live valve damper in front fork 34, or the like. In one embodiment, suspension controller 39 use the sensor information to recognize when bicycle 50 is climbing, traversing, or descending.

In one embodiment, suspension controller 39 monitors the terrain at a rate of a thousand times per second and make suspension adjustments in a matter of milliseconds. For example, in one embodiment, sensors on the fork, rear axle, and/or frame read bump input at the wheel and the pitch angle of the bicycle 50, and send the obtained sensor data to the suspension controller 39 at a rate, such as but not limited to, 1,000 times per second. Thus, by placing sensors on the frame and/or proximate both wheels, the suspension controller 39 processes data from the terrain to constantly adjust the suspension for maximum efficiency and control. In one embodiment, suspension controller 39 includes a lithium ion battery as the main user interface and can be charged (e.g., via micro USB) on or off the bicycle 50.

For example, in one embodiment, the time of flight sensor detects a depression in the terrain. The depression data generated by the time of flight sensor is provided to the damping suspension controller 39 which will then compare the measurement data against the nominal value and generate a command to one or more of the active valves to change to the damping setting of one or more dampers when the nominal value is exceeded. For example, a compression damping setting would be softened, a rebound damping speed setting would be increased, etc.

In one embodiment, after detecting the depression, the time of flight sensor detects an upcoming rise in the terrain (e.g., the other side of the depression) and then makes a number of consistent measurements indicating a (relatively) smooth surface. In one embodiment, the rise in the terrain and the return to a constant distance measurement data generated by the time of flight sensor is provided to the damping suspension controller. When the damping suspension controller determines that the obstacle has been passed, in one embodiment, it will generate the command to the active valve to change to the damping setting of the one or more dampers back to the pre-obstacle compression and/or rebound settings. For example, the compression damping setting would be stiffened, the rebound speed setting would be decreased, etc.

In one embodiment, measurement type sensor 41 continuously and/or repeatedly measures a distance from the bicycle fork steerer tube, crown, or other fixed point to the lower stanchion, wheel, fender, ground, or other fixed point. By monitoring the distance between these points, the measurement type sensor can determine the suspension travel used and the speed at which the bicycle fork suspension compressed and rebounded.

In one embodiment, sensor 40 is a measurement type sensor such as an infrared based time of flight sensor and the like. In one embodiment, the measurement type sensor continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded.

In general, the one or more sensors may be attached to the swing arm 26 directly, to any link thereof, to an intermediate mounting member, to front fork 34, to active valve damper 38, seat 32, handlebar assembly 36, or to any other portion or portions of the bicycle 50 as may be useful, available, or the like. In general, one or more sensors may be integrated with the vehicle structure, suspension components, suspension component controller(s) and data processing system as described in U.S. Pat. Nos. 7,484,603; 8,838,335; 8,955,653; 9,303,712; 10,060,499; 10,443,671; and 10,737,546; each of which is herein incorporated, in its entirety, by reference. Sensors and valve actuators (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, sensors and valves, or principles, of patents and other documents incorporated herein by reference, may be integrated one or more embodiments hereof, individually or in combination, as disclosed herein.

Although four sensors are shown in FIG. 1B, it should be appreciated that there may be only a single sensor or two or more sensors in operation. Moreover, in one embodiment, mobile device 95 is part of the active valve system 75.

In one embodiment, one or a plurality of component(s) of the bicycle 50 are also smart component(s). Examples of the smart component(s) can include one or more of the forks, wheels, rear shocks, front shocks, handlebars, seat posts, pedals, cranks, and the like. In one embodiment, the smart component(s) will include connective features that allow them to communicate wired or wirelessly with suspension controller 39, mobile device 95, one or more sensors, and/or any other smart component(s) within transmission range (thereby becoming connected components). In one embodiment, the sensors, smart components, smart devices, controllers, valves, and the like may be interconnected or connected by (one or a combination of) wire, or wirelessly via systems such as near field communication (NFC), WAN, LAN, Bluetooth, WiFi, ANT, GARMIN® low power usage protocol, or any suitable power or signal transmitting mechanism, making them connected components.

By using a connected component, data (including real-time data) can be collected from the smart component by suspension controller 39. Depending upon the connected component, data such as telemetry attributes to provide angle, orientation, velocity, acceleration, RPM, operating temperature, and the like, can be obtained.

For example, a smart wheel would be a connected component that is attached to the wheel (or wheels) to provide telemetry such as RPM, tire pressure, tire temperature, or the like to suspension controller 39. For example, the smart component could be a smart valve stem, a MEMS device, or the like coupled with the rim of the wheel.

An example of a smart handlebar would be a connected component that provides handlebar geometry information, handlebar dimensions, stress measurements, or the like. For example, the smart component could be a MEMS device coupled with the handlebar.

An example of a smart seat post would be connected component that provides geometry information such as seat height, seat pitch, roll, yaw, seat forward or aft location, weight on the seat, or the like. For example, the smart component could be a MEMS device coupled with the seat post.

An example of a smart pedal would be a connected component that provides telemetry such as RPM's, push and pull pressure, left side versus right side performance data (e.g., a stronger force on the right pedal or left pedal, in the up or down direction), or the like. For example, the smart component could be a MEMS device or other sensor type coupled with the pedal(s).

An example of a smart crank set would be connected component that provides telemetry such as RPM's, chain tension, chain temperature, internal crank temperature, bearing operation, or the like. For example, the smart component could be a MEMS device coupled with the crank set.

Further, it should be appreciated that one or more sensors on a second vehicle (or any number of linked vehicles) could be providing information to the first vehicle (e.g., bicycle 50). For example, if two riders are riding two bikes within a certain range, the sensor data for both bicycles could be shared wirelessly such that the information from the sensors on the lead bike is also provided to the follow bicycle(s) (or automobiles, motorcycles, ATVs, snowmobiles, water vehicles, and the like). In so doing, data generated by one or more sensors of the lead vehicle (or settings from suspension controller 39) are provided the follow vehicle(s) with proper damper assembly settings. In one embodiment, mobile device 95 is used to provide the wireless connectivity. In one embodiment, suspension controller 39 include wireless communication capabilities to provide information to mobile device 95 or to another suspension controller 39.

Figure 2:
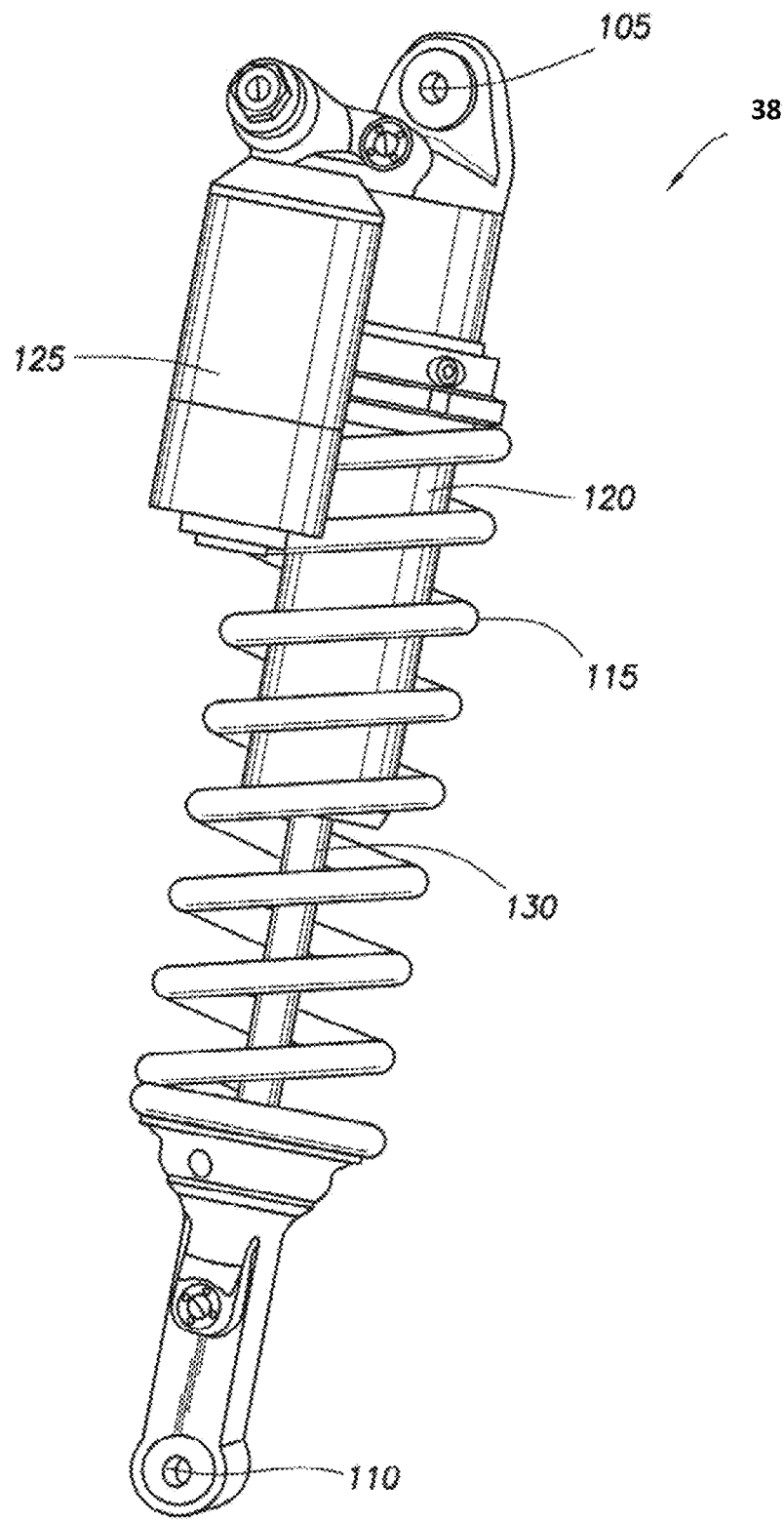
FIG. 2 is a perspective view of a damping assembly, in accordance with an embodiment.

FIG. 2 is a perspective view of an active valve damper 38 in accordance with one embodiment. In one embodiment, active valve damper 38 includes eyelets 105 and 110, damper housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the damper housing 120 includes a piston and chamber and the external reservoir 125 includes a floating piston and pressurized gas to compensate for a reduction in volume in the main damper chamber of the damping assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung damping assembly is shown in FIG. 2, this is provided as one embodiment and for purposes of clarity. In one embodiment, the active valve damper 38 could be a different type such as, but not limited to, an air sprung fluid damper assembly, a stand-alone fluid damper assembly, and the like.

Figure 3A:
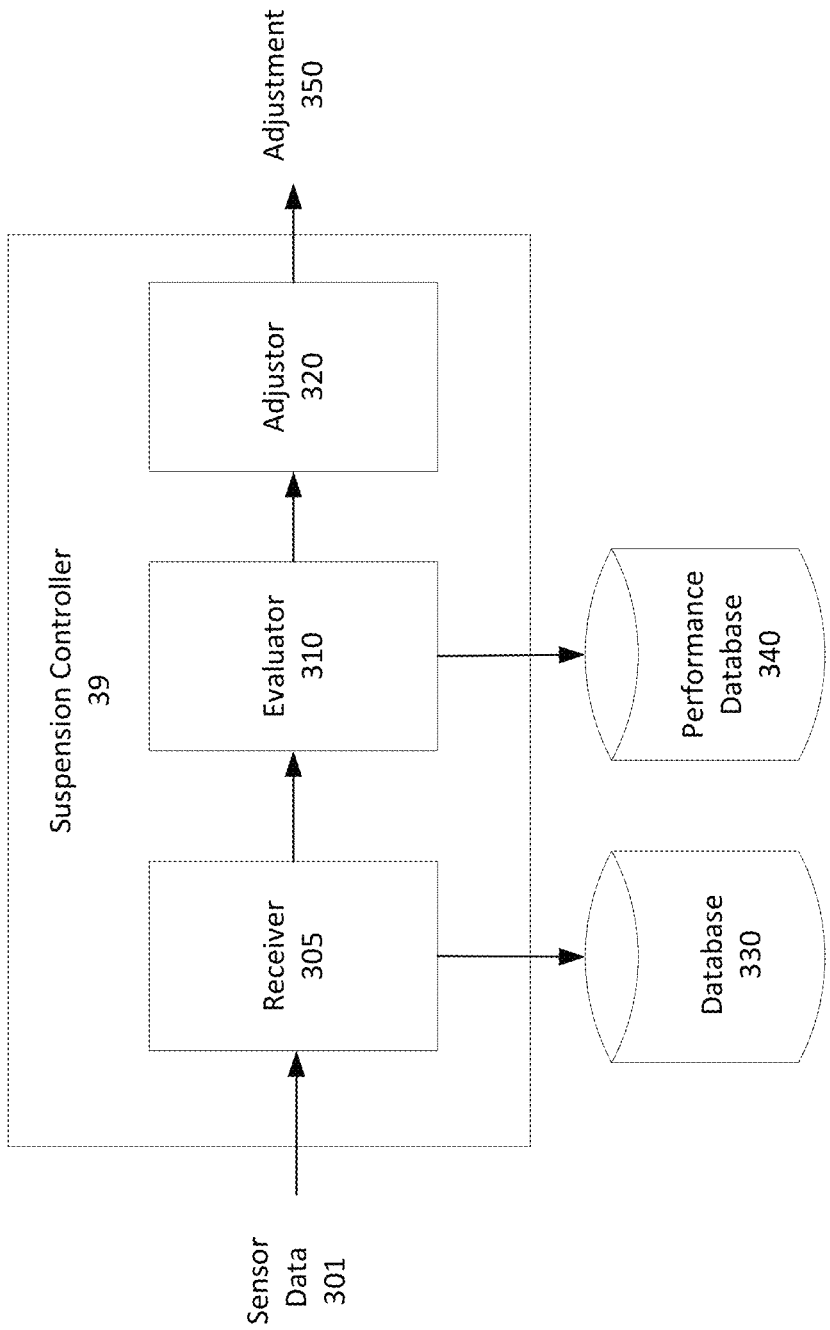
FIG. 3A is a block diagram of a suspension controller system, in accordance with an embodiment.

Referring now to FIG. 3A, a block diagram of a suspension controller system 300 is shown in accordance with an embodiment. In one embodiment, suspension controller system 300 includes a suspension control device (e.g., suspension controller 39) and at least one active valve damper and one or more sensors coupled with a vehicle as shown in FIGS. 1A and 1B. In one embodiment, suspension controller 39 includes a sensor data receiver 305, a sensor data evaluator 310, and an active valve damper adjustor 320.

In one embodiment, sensor data receiver 305 receives sensor data 301 from the one or more sensors (shown and described in FIGS. 1A-2). In one embodiment, sensor data receiver 305 utilizes database 330 (or other memory solution) to collect and store the received sensor data 301.

In one embodiment, sensor data evaluator 310 determines a value of a repeating pattern identified in the sensor data, obtains a range of operational values for at least one damping characteristic of the active valve damper related to the repeating pattern, and adjusts the range of operational values based on the repeating pattern value. In one embodiment, the operational values for at least one damping characteristic of the active valve damper are stored in performance database 340. In one embodiment, the repeating pattern is indicative of a terrain type being traversed by the vehicle.

In one embodiment, active valve damper adjustor 320 is configured to monitor and adjust at least one damping characteristic of the at least one active valve damper (e.g., active valve damper 38). That is, active valve damper adjustor 320 will provide adjustment 350 commands to at least one active valve damper (e.g., active valve damper 38).

Figure 3B:
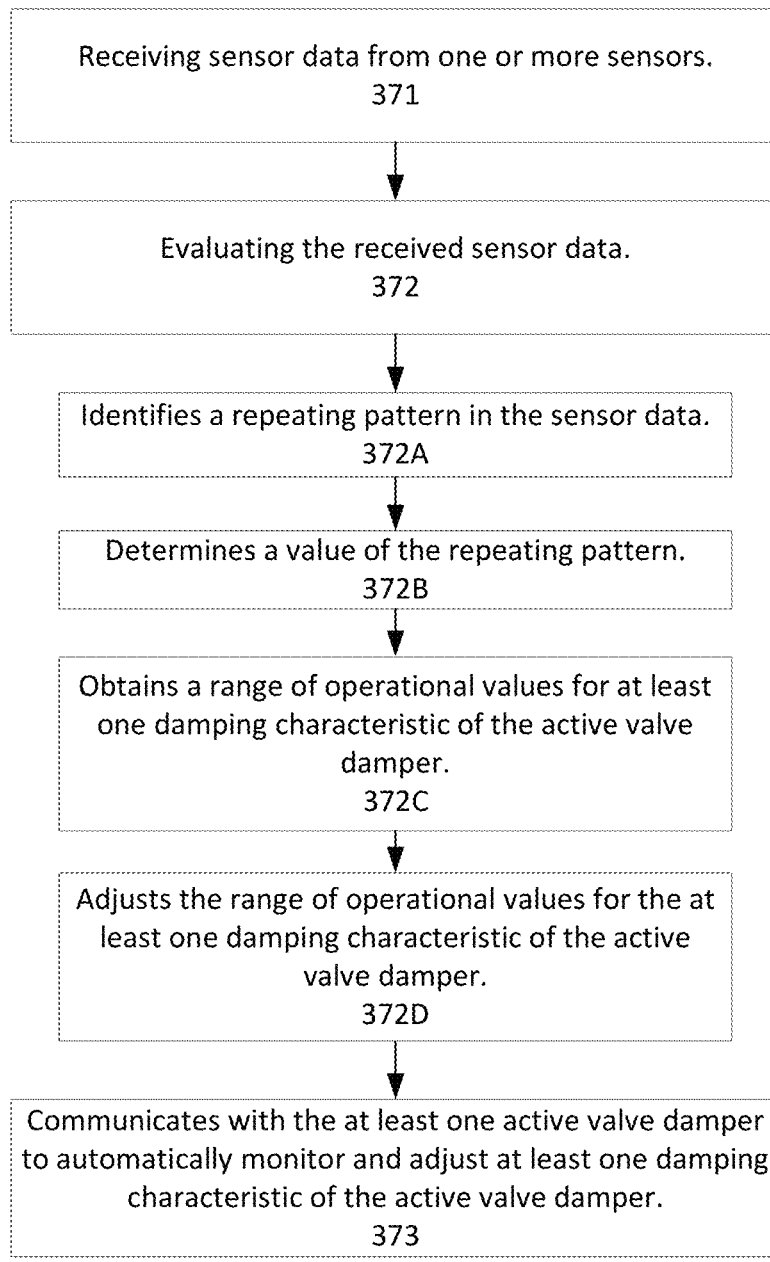
FIG. 3B is a flow diagram of method for suspension control, in accordance with an embodiment.

Referring now to FIG. 3B and still to FIG. 3A, a flow diagram 370 of a method for suspension control is shown in accordance with an embodiment.

At 371, one embodiment receives sensor data 301 from the one or more sensors. In one embodiment, the sensor data 301 is received by sensor data receiver 305. In one embodiment, sensor data 301 includes sensor data such as accelerometer data, measurement data, and the like. In one embodiment, sensor data 301 is received from a bump sensor attached to one or both of the front and rear wheels that senses the bumps encountered by bicycle 50 (e.g., reading the terrain).

In one embodiment, sensor data 301 is received from a measurement type sensor (such as measurement type sensor 41) that continuously and/or repeatedly measures a distance from the bicycle fork steerer tube, crown, or other fixed point to the lower stanchion, wheel, fender, ground or other fixed point. By monitoring the distance between these points, the measurement type sensor can determine the suspension travel used and the speed at which the bicycle fork suspension compressed and rebounded.

In one embodiment, sensor data 301 is received from a measurement type sensor (such as sensor 40) that continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded.

In one embodiment, sensor data 301 is received from a plurality of sensor types as described herein.

At 372, one embodiment evaluates the sensor data 301. In one embodiment, the sensor data 301 is evaluated by sensor data evaluator 310. At 372A, one embodiment identifies a repeating pattern in the sensor data. At 372B, one embodiment determines a value of the repeating pattern. At 372C, one embodiment obtains a range of operational values for at least one damping characteristic of the active valve damper related to the repeating pattern. In one embodiment, the range of operational values is obtained from performance database 340. At 372D, one embodiment adjusts the range of operational values for the at least one damping characteristic of the active valve damper based on the value of the repeating pattern.

At 373, one embodiment communicates with the at least one active valve damper 38 to automatically monitor and adjust at least one damping characteristic of the active valve damper 38.

Evaluation Using Frequency

In one embodiment, the sensor data is evaluated by sensor data evaluator 310 using real-time fast Fourier transform (FFT) to calculate frequency data from the sensor signal for a certain period of time. In one embodiment, performance database 340 will include a number of pre-identified frequency signals that have been previously associated with different types of terrain. For example, a gravel road will have a unique signature (e.g., unique frequency signal).

In one embodiment, sensor data evaluator 310 will access the performance database 340 and correlate (e.g., match, establish a level of similarity (e.g., 50% or greater match), and the like) the calculated frequency data from the sensor signal with one of the pre-identified frequencies signature associated with different types of terrain. For example, sensor data evaluator 310 will calculate the frequency data from the sensor signal and determine that the calculated frequency data reaches the threshold to consider it analogous to the pre-identified frequency signature associated with a gravel road.

In one embodiment, sensor data evaluator 310 will then access performance database 340 to obtain the appropriate damping settings for the gravel road. For example, the appropriate damping settings (e.g., gravel road settings) would include a bump threshold characteristic threshold such that the traveling along the gravel road will not be sufficient to trigger the suspension to open.

In one embodiment, sensor data evaluator 310 will compare the present damping characteristics, thresholds, and settings to determine if they are different from, or already set to, the gravel road settings. If the active valve damper 38 damping characteristics, thresholds, and settings are already set to the gravel road settings then no further actions would be needed.

In one embodiment, if the present active valve damper 38 damping characteristics, thresholds, and settings are not already set to the gravel road settings, sensor data evaluator 310 will provide the gravel road damping characteristics, thresholds, and settings to active valve damper adjustor 320 which will provide the adjustment 350 information to active valve damper 38.

In one embodiment, if the present active valve damper 38 damping characteristics, thresholds, and settings are not already set to the gravel road settings, sensor data evaluator 310 will monitor the input frequency for a certain period of time to determine that the bike is remaining on the gravel road and did not just cross a gravel road or encounter only a small patch of gravel road. For example, in one embodiment, the sensor data evaluator 310 would evaluate the calculated frequency data for 1-5 seconds in order to establish that the bike is continuing to be operated on a gravel road environment. In one embodiment, the evaluation time period could be much shorter or longer depending upon type of ride (e.g., race, training, fun, etc.), user settings, performance requirements (e.g., less than 3 seconds on a gravel road will not cause a significant change to a rider's performance, but more than 3 seconds will begin a noticeable performance degradation, etc.), and the like.

In one embodiment, if the present active valve damper 38 damping characteristics, thresholds, and settings are not already set to the gravel road settings, after the evaluation time period is achieved, sensor data evaluator 310 will provide the gravel road damping characteristics, thresholds, and settings to active valve damper adjustor 320 which will provide the adjustment 350 information to active valve damper 38.

In one embodiment, sensor data evaluator 310 will continue to calculate frequency data from the sensor signal monitor to determine that the bike is remaining on the gravel road. If the input frequency changes to a different signature for a certain period of time sensor data evaluator 310 will repeat the above process to switch the damping characteristics, thresholds, and settings to the appropriate terrain settings. For example, if the sensor data evaluator 310 determines that the bike has returned to hard pack (following one or more embodiments above), sensor data evaluator 310 will provide the hard pack damping characteristics, thresholds, and settings to active valve damper adjustor 320 which will provide any adjustment 350 information to active valve damper 38.

Evaluation Using Acceleration and PSD

In one embodiment, the sensor data is evaluated by sensor data evaluator 310 to determine acceleration magnitude and real time power spectral density (PSD) determinations. In general, PSD measures the power content of the sensor data signal versus the frequency of the sensor data 301. In one embodiment, the acceleration is measured in g's while the PSD is measured in watts per hertz (W/Hz). In general, PSD provides a measurement of the amount of "punch" that the event (e.g., bump) has given to the suspension.

In one embodiment, sensor data evaluator 310 will determine the acceleration magnitude and PSD from the sensor data 301. Sensor data evaluator 310 will monitor the input to determine when both the acceleration magnitude and the PSD breach a pre-defined threshold. For example, in one embodiment, the threshold for acceleration magnitude would be 5 g and the threshold for PSD is dependent upon user settings, manufacturer suggested, performance requirements and the like.

Once both the acceleration magnitude and the PSD breach their own pre-defined thresholds, sensor data evaluator 310 will provide the appropriate active valve damper 38 damping characteristics, thresholds, and settings to active valve damper adjustor 320 which will provide the adjustment 350 information to active valve damper 38.

In one embodiment, sensor data evaluator 310 will continue to calculate both the acceleration magnitude and the PSD to ensure that they are both remaining above their pre-defined thresholds. In one embodiment, if one or both of the acceleration magnitude and the PSD drop below their pre-defined thresholds, sensor data evaluator 310 will provide the previous damping characteristics, thresholds, and settings to active valve damper adjustor 320 which will provide the adjustment 350 information to active valve damper 38.

Evaluation Using Acceleration

In one embodiment, the sensor data is evaluated by sensor data evaluator 310 to include the derivative of acceleration (referred to herein as Jerk) from the acceleration data. Jerk is expressed in m/s$^3$ (SI units) or standard gravities per second (g/s).

In one embodiment, sensor data evaluator 310 will continuously determine the Jerk and apply a variance approach to the Jerk to detect rapid changes in the signal.

In one embodiment, performance database 340 will include a number of pre-identified Jerk signatures that have been previously associated with different types of terrain. For example, a gravel road will have a unique Jerk signature that is distinguishable from a paved road Jerk signature, a hard pack Jerk signature, etc.

In one embodiment, sensor data evaluator 310 will access the performance database 340 and correlate (or match, establish a level of similarity (e.g., 70% or greater match), and the like) the calculated Jerk from the sensor signal with one of the pre-identified Jerk signatures associated with different types of terrain. For example, sensor data evaluator 310 will calculate the Jerk from the sensor signal and determine that the calculated Jerk reaches the threshold to consider it analogous to the pre-identified Jerk signature associated with a gravel road.

In one embodiment, sensor data evaluator 310 will then access performance database 340 to obtain the appropriate damping settings for the gravel road. For example, the appropriate damping settings (e.g., gravel road settings) would include a bump threshold characteristic threshold such that the traveling along the gravel road will not be sufficient to trigger the suspension to open.

In one embodiment, sensor data evaluator 310 will compare the present damping characteristics, thresholds, and settings to determine if they are different from, or already set to, the gravel road settings. If the active valve damper 38 damping characteristics, thresholds, and settings are already set to the gravel road settings then no further actions would be needed.

In one embodiment, if the present active valve damper 38 damping characteristics, thresholds, and settings are not already set to the gravel road settings, sensor data evaluator 310 will provide the gravel road damping characteristics, thresholds, and settings to active valve damper adjustor 320 which will provide the adjustment 350 information to active valve damper 38.

In one embodiment, sensor data evaluator 310 will continue to calculate the Jerk to ensure that remains a match to the presently utilized gravel road Jerk signature. In one embodiment, if the real-time Jerk no longer matches the gravel road Jerk signature, sensor data evaluator 310 will perform another comparison and provide the new Jerk signature damping characteristics, thresholds, and settings to active valve damper adjustor 320 which will provide the adjustment 350 information to active valve damper 38.

In one embodiment, sensor data evaluator 310 will provide the gravel road damping characteristics, thresholds, and settings to active valve damper adjustor 320 which will provide the adjustment 350 information to active valve damper 38 as soon as the Jerk signature is identified.

In one embodiment, sensor data evaluator 310 will monitor the Jerk for a certain period of time before moving to the changed settings to ensure that the bike is remaining on the gravel road and did not just cross a gravel road or encounter only a small patch of gravel road. For example, in one embodiment, the sensor data evaluator 310 would evaluate the Jerk for 1-3 seconds in order to establish that the bike is continuing to be operated on a gravel road environment. In one embodiment, the evaluation time period could be much shorter or longer depending upon type of ride (e.g., race, training, fun, etc.), user settings, performance requirements (e.g., less than 2 seconds on a gravel road will not cause a significant change to performance, but more than 2 seconds will begin a noticeable performance degradation, etc.), and the like.

In one embodiment, if the present active valve damper 38 damping characteristics, thresholds, and settings are not already set to the gravel road settings, after the evaluation time period is achieved, sensor data evaluator 310 will provide the gravel road damping characteristics, thresholds, and settings to active valve damper adjustor 320 which will provide the adjustment 350 information to active valve damper 38.

Noise Floor Approach

In one embodiment, the vibration (e.g., sensor noise or noise not due to mechanical movement) coming from the surface of the ground has a certain acceleration noise which is a much higher frequency than a lower frequency when the sensor detects a discrete bump caused by hitting a rock or tree root (for example). This higher frequency noise floor creates an offset to the acceleration signal. In one embodiment, the frequency of bump input to the sensor is usually in the range of 1-50 Hz thus any frequency above 50 Hz would be considered the sensor noise. In one embodiment, the frequency of bump input to the sensor is in the range of 1-30 Hz thus any frequency above 30 Hz would be considered the sensor noise. Although a number of examples are provided, it should be appreciated that the actual values could be of a higher or lower range depending upon sensor metrics, manufacturer suggestions, performance requirements, rider preference, and the like.

For example, the bump threshold to change the suspension mode is set at approximately 5 g (or any other threshold setting selected by manufacturer, rider, or the like). However, while on the ride, the higher frequency noise floor is causing the sensor data evaluator 310 to continually determine a constant 3 g for acceleration magnitude (e.g., the road noise). Without adjustment, the sensor data evaluator 310 would have active valve damper adjustor 320 send the adjustment 350 commands to active valve damper 38 whenever an acceleration event of greater than 2 g occurred (e.g., 3 g background noise plus 2.1 g event). This would cause a softening of the suspension to occur well below the pre-set 5 g event threshold is met.

To overcome this problem, in one embodiment, sensor data evaluator 310 will modify the original bump threshold value to be a modified bump threshold value derived from the original bump threshold value plus the higher frequency noise floor acceleration magnitude. For instance, using the above example, sensor data evaluator 310 continually determines a constant 3 g for the higher frequency noise floor acceleration magnitude (e.g., the road noise). As such, the sensor data evaluator 310 will modify the original bump threshold value 5 g to a modified bump threshold value 8 g (e.g., 3 g floor noise+5 g bump threshold value). In so doing, the sensor data evaluator 310 would have active valve damper adjustor 320 send the adjustment 350 commands to active valve damper 38 whenever an acceleration event of greater than 8 g was determined by sensor data evaluator 310.

In one embodiment, instead of sensor data evaluator 310 modifying the original bump threshold value to be a modified bump threshold value derived from the original bump threshold value plus the higher frequency noise floor, sensor data evaluator 310 will filter out the higher frequency noise floor. For instance, using the above example, sensor data evaluator 310 continually determines a constant 3 g for the higher frequency noise floor acceleration magnitude (e.g., the road noise). As such, the sensor data evaluator 310 will filter out the 3 g noise floor while keeping the bump threshold value at the 5 g threshold value. In so doing, the sensor data evaluator 310 would establish a base line at the higher frequency noise floor and have active valve damper adjustor 320 send the adjustment 350 commands to active valve damper 38 whenever an acceleration event of greater than 5 g above the base line, was determined by sensor data evaluator 310.

In one embodiment, sensor data evaluator 310 will continue to calculate the higher frequency noise floor (over a given period of time) and continually adjust the base line, the bump threshold range, or the like based on the most recent higher frequency noise floor. For example, in one embodiment, sensor data evaluator 310 would calculate the higher frequency noise floor average for a given period of time (such as every five minutes, two minutes, one minute, 30 seconds, n-minutes, n-seconds, etc.). The most recently determined higher frequency noise floor average would then be used for the time period required for the sensor data evaluator 310 to determine the next-in-time higher frequency noise floor average. Once the next-in-time higher frequency noise floor average was determined, it would replace the previous higher frequency noise floor average.

For example, in one embodiment, the higher frequency noise floor average is determined by sensor data evaluator 310 over a 2-minute time window. After the 2-minute time window ends, the higher frequency noise floor average is determined to be 2.2 g. During the next 2-minute time window, sensor data evaluator 310 would adjust the base line by filtering out 2.2 g from the acceleration signal data (or adjust the bump threshold range to 7.2 g), or the like. In addition, during the same time period, sensor data evaluator 310 would also be monitoring the higher frequency noise floor.

At, about, or right after the closing of the 2-minute time window, sensor data evaluator 310 would have a new next-in-time higher frequency noise floor average (for example, the average over the latest 2-minute time window was 1.5 g). This new average (1.5 g) would be used over the next 2-minute time window; e.g., sensor data evaluator 310 would adjust the base line by filtering out 1.5 g from the acceleration signal data (or adjust the bump threshold range to 6.5 g), or the like; and the cycle would continue to repeat.

In one embodiment, (e.g., in one or more of the above examples) instead of using a block of time approach, the sensor data evaluator 310 would continually adjust the higher frequency noise floor average over a rolling time period. In other words, the higher frequency noise floor is based on a rolling 2-minute average such that the higher frequency noise floor average would be continually updated by sensor data evaluator 310. For example, in one embodiment, starting after 2-minutes of time, sensor data evaluator 310 would set the higher frequency noise floor at 1.8 g (e.g., the average of the measurements taken from time zero to 2-minutes). The rolling 2-minute average would continue to be adjusted by throwing out measurements older than 2-minutes in the past and replacing them with the latest measurement. For example, at 5 minutes into the ride, the determined higher frequency noise floor would be set at the average of the measurements taken from time 3-minutes to 5-minutes. At 21 minutes and 20 seconds into the ride, the determined higher frequency noise floor would be set at the average of the measurements taken from time 19-minutes and 20-seconds to 21-minutes and 20-seconds. Etc.

In one embodiment, the first time period of the ride would have no noise floor, would have a noise floor average taken for the entirety of time until the first time period was completed, etc. Moreover, although 2-minutes is used herein, the time window may be larger or smaller and may be dependent upon type of ride (e.g., race, training, fun, etc.), user settings, performance requirements, manufacturer recommendation, or the like.

In one embodiment, the sensor data evaluator 310 will use one, some, a combination of different features of some or all of the different approaches, or all of the different approaches (e.g., evaluation using frequency, evaluation using acceleration and PSD, evaluation using acceleration, noise floor approach, etc.) to determine when the suspension should, or should not, be adjusted.

Power Spectral Density

In one embodiment, different rides may have certain power spectral density signatures, power spectral density type maps, trail fingerprints, etc. In other words, actual ride characteristics such as surface terrain (e.g., road, trail, dirt, gravel, sand, mud, rock crawling, etc.), speed, and grade information (e.g., uphill speed, downhill speeds, flat speeds, etc.) can be correlated with the associated performance of the vehicle (or one or more suspension components thereof) for the ride (e.g., compression/rebound rates, suspension travel speeds, suspension travel ranges, etc. This information will be used to determine power spectral density signatures, maps, etc.

In one embodiment, there is a collection of the spectral density diagrams and/or the presentation of the spectral density diagrams to utilize for suspension setting determinations.

For example, in a very basic example, a paved road would have a first power spectral density signature, a gravel road would have a second power spectral density signature, and a dirt road would have a third power spectral density signature. Of course, embodiments herein are able to provide different power spectral density signatures for different ride types with those categories, and among combinations of different categories. For example, rides can be broken down into categories, such as, but not limited to concrete, asphalt, gravel size, rock crawling, road age (e.g., old, new, etc.), temperature aspects (e.g., hot, cold, etc.), weather aspects (e.g., dry, wet, icy, etc.), and the like.

In one embodiment, as additional rides on different terrain types are identified, mapped, and ridden, that power spectral density information is added to the ride database (e.g., database 330, performance database 340, a database stored in a rider's mobile device 95 memory, stored in the memory of the controller 39, etc.) along with suspension settings, suggestions, and the like. In so doing, the power spectral density information can be correlated with different ride and terrain characteristics and the associated suspension settings can be obtained. These suspension settings can then be automatically applied to the suspension, provided as suggested manual user input to change suspension settings, or a combination thereof.

In one embodiment, the power spectral density information could be provided at a number of different databases. For example, when the rider is home planning the ride, they may be using a home computer/laptop/tablet, or the like to interact with a large storage environment (either locally e.g., ROM 710 or over a network connection e.g., database 330, performance database 340, etc.) of power spectral density information to generate a filtered amount of power spectral density information and its associated suspension settings configuration data. This filtered amount of power spectral density information and associated suspension settings can then be added to the memory of the rider's mobile device 95 and/or the memory slots of suspension controller 39.

On the way to the ride, the rider may utilize their mobile device 95 to interact with local storage or over a network connection to interact with their home computer database (e.g., ROM 710) or the network database(s) (e.g., database 330, performance database 340, etc.) to further filter/update the power spectral density information suspension settings to include location information, weather information, etc. In one embodiment, this information is added to (or replaces) the power spectral density information and associated suspension settings in the memory of the rider's mobile device 95 and/or the memory slots of suspension controller 39.

In one embodiment, if the rider is out of long range network coverage, they may only be able to access the local storage on their controller 39, local storage on their mobile device 95 along with an Application thereon, storage on a laptop or tablet, USB, hard drive, SSD, etc. to make any final inputs (e.g., components, weather, location data, terrain type, ride course changes, etc.) and receive the finalized version of the suggested initial suspension settings.

In one embodiment, for a vehicle with passive suspension there will only be one suggested suspension setting e.g., the configuration for the vehicle to be set before the ride/drive commences.

In contrast, a vehicle with an active or semi-active suspension might receive an initial suggested suspension setting (that is manually or automatically set-up prior to the start of the ride/drive), a number of suggested suspension settings to be implemented (automatically, upon rider/driver/passenger approval, manually, or a combination thereof) as the ride/drive is being performed, where the suggested suspension settings to be implemented are based on actual performance data suggested modifications and/or for the different terrain segments that are encountered.

In one embodiment, the different power spectral density information and associated suspension settings can be obtained based on rides that have already been ridden. For example, after a ride, the power spectral density information for the ride, including the terrain characteristics, speed, and the associated suspension settings can be downloaded to the ride database. This information would then be available to be used to establish suspension settings for another rider that is going to go on some or all of the same ride. In one embodiment, each time a given ride (or portion of the ride) is made, the power spectral density information and associated suspension settings can be used to refine the suspension settings model.

In one embodiment, the amount of input from a repeated ride may be weighed by a metric such as skill/ride level, experience, suspension components, bike characteristics, rider characteristics, etc. For example, in one embodiment, a professional rider's data would be weighted more than a non-professional rider's data for purposes of refining the suspension model.

In one embodiment, the amount of input from a repeated ride may be weighed by a metric such as a rider's characteristic, e.g., weight, height, inseam, or the like. For example, data from a rider with a weight (height, etc.) that is outside of one standard deviation above or below normal might be weighted less than data from a rider within one standard deviation of normal.

In one embodiment, the different power spectral density information and associated suspension settings can be extrapolated for rides (or portions of rides) that have not been ridden, or do not have information stored in the ride database. For example, the new ride is a fire road of dirt and gravel with different grades. Power spectral density information for previously ridden fire roads of dirt and gravel with similar grades can be used to extrapolate likely initial suspension settings for the new ride. In another example, a new ride includes a sand terrain portion, as such, power spectral density information for previously ridden sand terrain is used to extrapolate likely initial suspension settings for the new ride. In yet another example, when the new ride includes a sand terrain portion, power spectral density information for previously ridden sand terrain with similar features (e.g., grades, corners, expected speeds, and the like) and/or weather conditions, etc. is used to extrapolate likely initial suspension settings for the new ride.

In one embodiment, once the rider begins riding on the new ride with the extrapolated suggested initial suspension settings, the suspension settings can be evaluated in real-time to determine any adjustments that may be made to the initial suspension settings (e.g., automatic adjustments and/or providing a suspension adjustment setting suggestion to a user for a manual suspension change).

In one embodiment, as the ride is made (or after the ride is completed), the power spectral density information is then added to the database, such that the new actual power spectral density information is available for the actual ride performed. In addition, as described herein, in one embodiment, the new power spectral density information is used to update the power spectral density database for a given terrain/environment. Thus, the actual ride data is available for suspension setting suggestions/automation and the power spectral density information for extrapolation will also be refined.

Thus, embodiments described herein provide at least long time averaging and short time obstacle adjustment suspension settings capability.

For example, a ride can be broken down into segments, and in an active adjustable suspension, the suspension settings can be adjusted per segment or suggested suspension settings can be provided to the suspension management user (e.g., rider, driver, navigator, etc.) such that the suspension settings are available for each segment. For example, as a truck (or motorcycle, bicycle, e-bike, car, side-by-side, snowmachine, etc.) is driven along a ride, the suspension settings could be initially set for the paved road segment, then adjusted to the dirt road segment, adjusted for a whoops segment, back to the dirt road segment, a muddy segment, back to the dirt road segment, a sandy segment, a dunes segment, a fast dirt road segment, a slow rock crawling segment, back to the dirt road segment, etc.

In one embodiment, once the driver begins the ride, the suspension settings can be evaluated in real-time to determine any adjustments that should be made to one or more of the different suspension settings (e.g., automatic adjustments and/or providing a suspension adjustment setting suggestion to a user). In one embodiment, any real-time suspension setting adjustments will be used for each segment of the same terrain type along the ride. For example, if the dirt road segment suspension setting is modified, when the suspension is later set to the next dirt road segment, the modified dirt road segment suspension settings will be used.

In one embodiment, this type of active adjustment can be based on modifications to suspension settings based upon changing conditions such as weather, temperature, and the like. For example, if the third dirt road segment is warmer (or wetter, etc.) the previously modified dirt road segment suspension settings may be further modified based on the changing temperature, weather, and the like. That is, instead of modifying the initial third dirt road segment suspension settings based upon the changed/changing conditions, the previously modified dirt road segment suspension settings will become the new dirt road baseline suspension settings and any modifications based upon the changed/changing conditions will be made to the new dirt road baseline suspension settings.

In a suspension that is not actively adjustable, the segments (and their associated suspension settings) can be evaluated to determine one or more of, the segment or segments that will be most often encountered during the ride, which segment or segments will have the most impact on the suspension, which segment or segments are the most valuable for having the best suspension performance, overall ride-time, etc. This information can then be used to generate a single suspension setup that is used on a non-active suspension to obtain the best overall performance for a given ride.

For example, in the ride discussed above, e.g., a ride having a paved road segment, a dirt road segment, a whoops segment, another dirt road segment, a muddy segment, another dirt road segment, a sandy segment, a dunes segment, a fast dirt road segment, a slow rock crawling segment, and another dirt road segment, in one embodiment, the suspension settings may be based on the dirt road settings since the ride is mostly on dirt.

In one embodiment, the suspension settings may be based the sandy segment since that segment will be the slowest or hardest to traverse without the appropriate sand suspension settings. In one embodiment, the suspension settings may be based upon a combination or amalgamation of the dirt and sand settings to provide a suspension that is passable for the sand segment but provides better performance than the sand settings on the longer dirt road segments, or the like to arrive at the fastest overall time for the given ride, or the like.

In one embodiment, once the suspension setting determination is made (automatically, based on user preference, based on a combination of data evaluation and user input, and the like), the suspension settings will be generated for the bicycle (or motorcycle, e-bike, car, side-by-side, truck, snowmobile, etc.) and provided for the rider (or crew/mechanic/etc.) to set-up the suspension accordingly. In one embodiment, once set, those suspension settings will be used for the entirety of the ride.

In one embodiment, during the ride, power spectral density information will be recorded. Once the ride is completed, the power spectral density information can be evaluated to determine if any adjustments should be made to one or more of the different suspension settings (e.g., there were x-bottom outs, the suspension was too hard for too much of the ride or an important segment of the ride such that significant time/performance was lost, the suspension was too soft for too much of the ride or an important segment of the ride such that significant time/performance was lost, the suspension was perfectly set for one or more of the segments, etc.).

In one embodiment, regardless of whether there was a single suspension setting or active suspension setting adjustments, the power spectral density information will be stored, added to the database, or the like and used to confirm suspension settings for a given power spectral density signature, establish new (modified) suspension setting for a given power spectral density signature, added to an existing amount of similar suspension settings for a given power spectral density signature (either weighted or not), and the like. As such, the next time a ride is made across the already ridden terrain, there will be existing power spectral density information with associated suspension settings. Such information will include the resultant base-line active suspension setting information as well as set-and-forget suspension settings that are generated based on actual performance data across the previously driven ride. In one embodiment, the enhanced power spectral density information with associated suspension settings will also be available for extrapolating suspension set-up for yet another new ride.

In one embodiment, the spectral density information is generated as a 3-D surface of spectral density curves to reduce the size of the data being transmitted. In one embodiment, the comparison is done locally (e.g., on vehicle) at the sensor and the answer (e.g., the suspension setting adjustment) is sent to the controller/active valve. In one embodiment, the sensor information is provided to a mobile device 95, the controller 39, a networked computing system and the like and the comparison is done locally (e.g., on vehicle) at the computing device and the answer (e.g., the suspension setting adjustment) is sent to the controller and/or active valve. In one embodiment, the sensor information is provided to a mobile device 95, the controller 39, a networked computing system and the like and the comparison is done remotely (e.g., off vehicle) and the answer (e.g., the suspension setting adjustment) is sent to the mobile device 95 (or the like) and provided to controller 39 and/or active valve 450.

Example Active Valve

Figure 4:
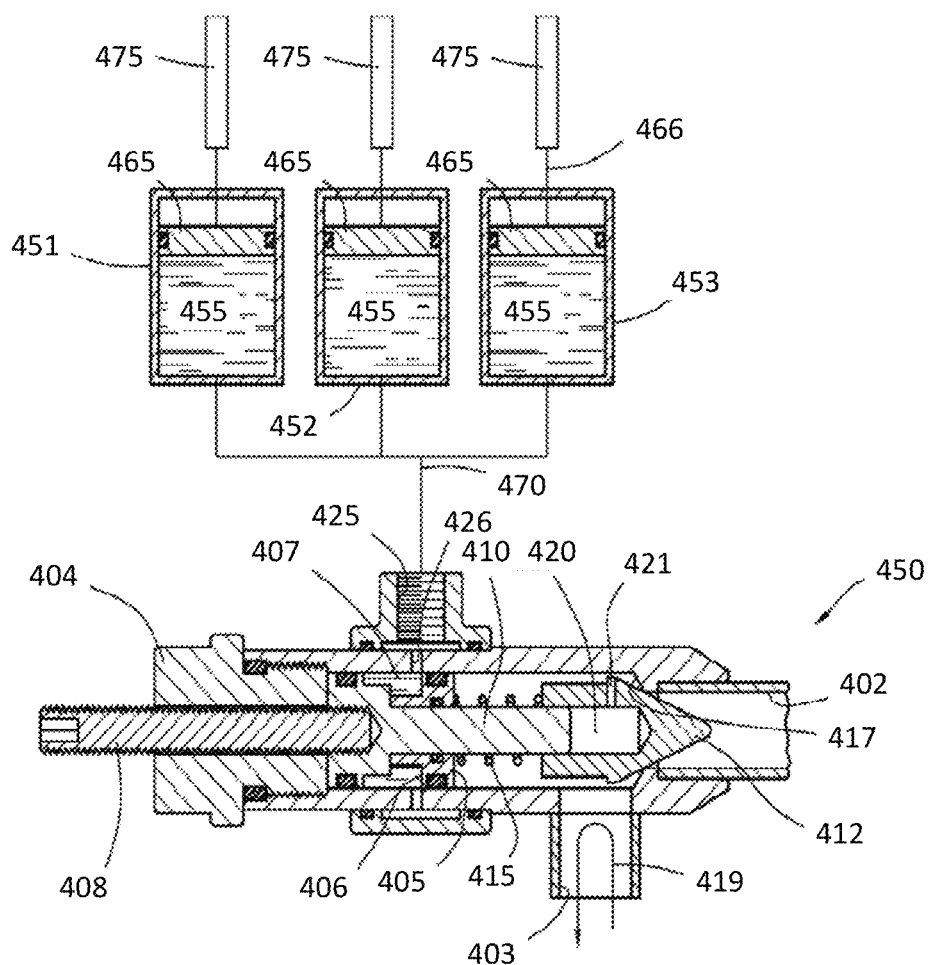
FIG. 4 is an enlarged section view showing an active valve and a plurality of valve operating cylinders in selective communication with an annular piston surface of the active valve, in accordance with an embodiment.

Referring now to FIG. 4, a schematic view of an active valve 450 is shown in accordance with an embodiment. Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to vehicle changes in motion (e.g., acceleration, deceleration, etc.). In one embodiment, active valve 450 is controlled in response to braking pressure (as measured, for example, by a brake pedal (or lever) sensor or brake fluid pressure sensor or accelerometer). In one embodiment, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of U.S. Pat. No. 9,353,818 which is incorporated by reference herein, in its entirety, as further example of different types of "electronic" or "active" valves. Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the damping assembly 200, damping occurs as the distance between cone shaped member 412 and orifice 402 is reduced. The result is a controllable damping rate. Certain active valve features are described and shown in U.S. Pat. Nos. 8,627,932; 8,857,580; 9,033,122; 9,120,362; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

Figure 5:
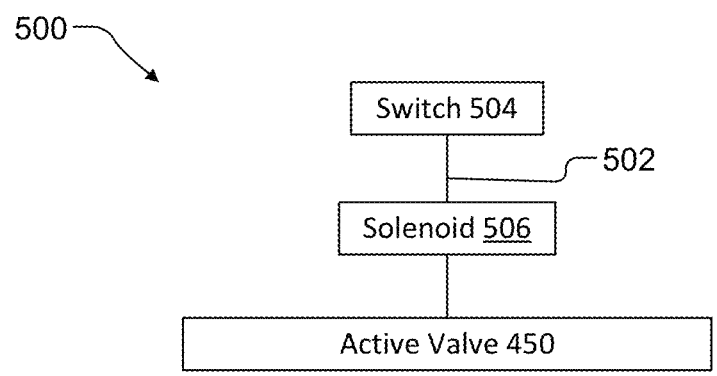
FIG. 5 is a schematic diagram showing a control arrangement for an active valve, in accordance with an embodiment.

FIG. 5 is a flow diagram of a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450. In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding damping assembly 200. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s). The active valve(s) could be used for fluid flow path control, for bottom out control, for an internal bypass, for an external bypass, for a fluid conduit to the external reservoir 125, etc. In other words, anywhere there is a fluid flow path within damping assembly 200, an active valve could be used. Moreover, the active valve could be alone or used in combination with other active (semi-active, or passive) valves at other fluid flow paths to automate one or more of the damping performance characteristics of the damping assembly. Moreover, additional switches could permit individual operation of separate active bottom out valves.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle.

Figure 6:
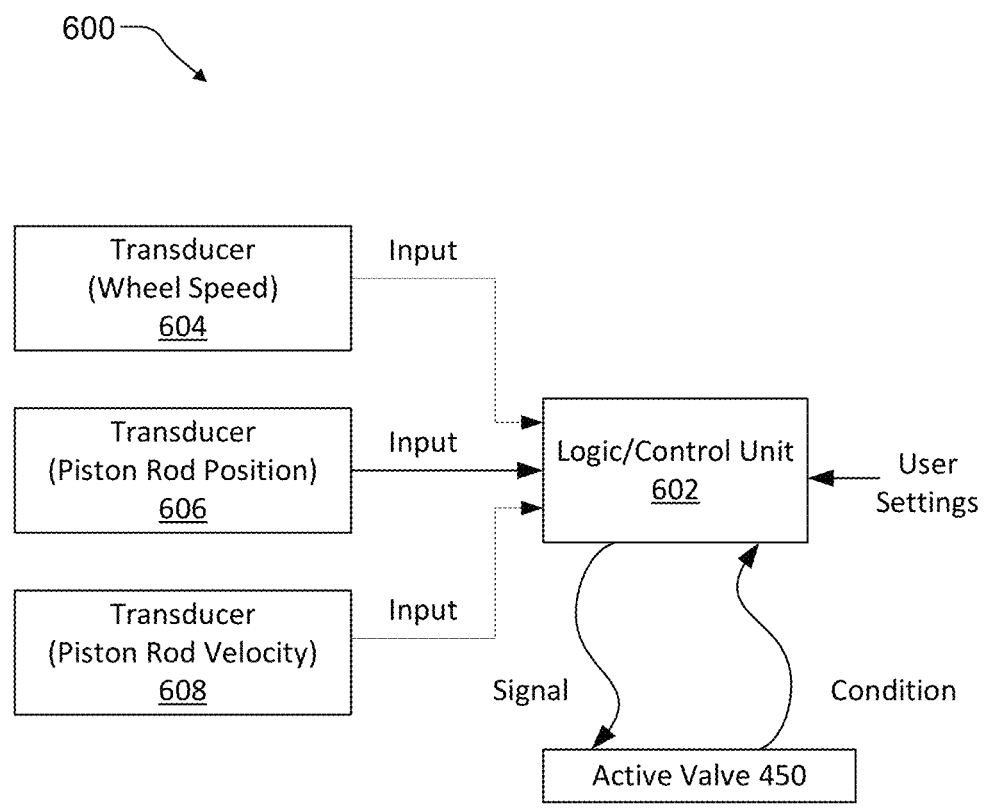
FIG. 6 is a schematic diagram of a control system based upon any or all of vehicle speed, damper rod speed, and damper rod position, in accordance with an embodiment.

FIG. 6 is a flow diagram of a control system 600 based upon any or all of vehicle speed, damper rod speed, and damper rod position. One embodiment of the arrangement of control system 600 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the damping assembly 200 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to orifice 402 of damping assembly 200, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Figure 7:
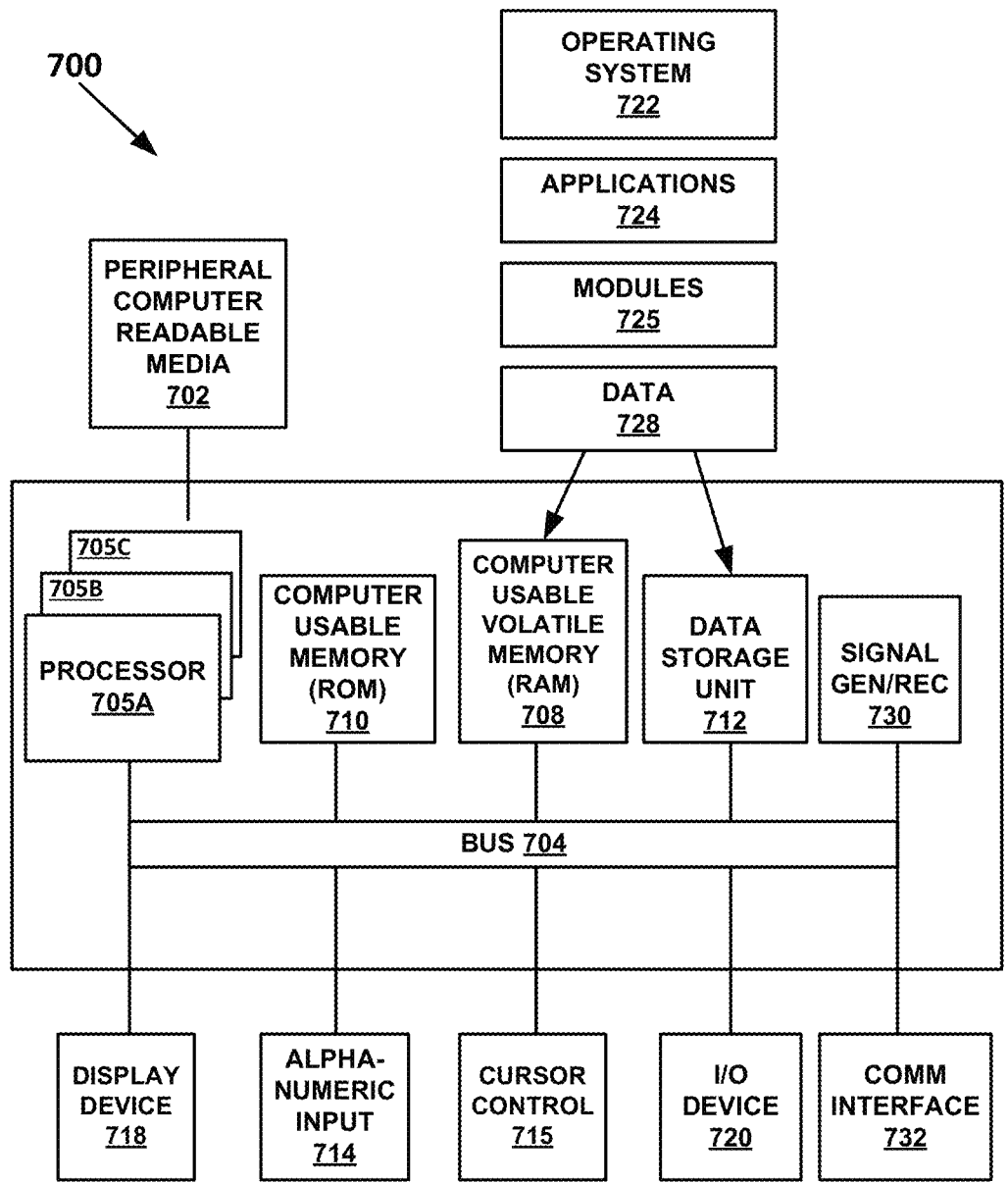
FIG. 7 is a block diagram of a computer system, in accordance with an embodiment.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, suspension controller 39 can include some or all of the components of computer system 700. In different embodiments, suspension controller 39 can include communication capabilities (e.g., wired such as ports or the like, and/or wirelessly such as near field communication, Bluetooth, WiFi, or the like) such that some of the components of computer system 700 are found on suspension controller 39 while other components could be ancillary but communicatively coupled thereto (such as a mobile device, tablet, computer system or the like). For example, in one embodiment, suspension controller 39 can be communicatively coupled to one or more different computing systems to allow a user (or manufacturer, tuner, technician, etc.) to adjust or modify any or all of the programming stored in suspension controller 39. In one embodiment, the programming includes computer-readable and computer-executable instructions that reside, for example, in non-transitory computer-readable medium (or storage media, etc.) of suspension controller 39 and/or computer system 700.

In one embodiment, computer system 700 includes an address/data/service bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 can be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet.

Referring still to FIG. 7, various other components are depicted for computer system 700. Specifically, when present, an operating system 722, applications 724, modules 725, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, WiFi, Cellular modem, or other input/output interface. Communication interface 732 may physically, electrically, optically, or wirelessly (e.g., via radio frequency) couple computer system 700 with another device, such as a mobile phone, radio, or computer system.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

In one embodiment, output from an embodiment of the rough road detection used to determine when a suspension change is warranted based on a terrain type being traversed by the vehicle and/or one or more sensor inputs described herein, is well-suited to being received by, and/or utilized as input to, a customizable tune application such as an active valve customizable tune application.

In one embodiment, the output from a customizable tune application such as an active valve customizable tune application, and/or one or more sensor inputs, provided to and/or utilized by the customizable tune application is well-suited to being used by a rough road detection embodiment. In one embodiment, the input information is used to supplement the inputs to the rough road detection sensor capabilities. In one embodiment, the performance of the rough road detection is performed on an application such as the mobile device application, or other computing devices such as the desktop, laptop, virtual computing environments, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above.

Rather, the specific features and acts described above are disclosed by way of illustration and as example forms of implementing the claims and their equivalents.

What is claimed is:

1. A system comprising:
   a sensor data receiver configured to receive sensor data from one or more sensors monitoring a vehicle;
   a sensor data evaluator configured to:
   identify a repeating pattern in said sensor data, said repeating pattern indicative of a terrain type being traversed by said vehicle;
   determine a value of said repeating pattern;
   obtain a present set of operational values for at least one damping characteristic of an active valve damper coupled with said vehicle;
   modify said present set of operational values for said at least one damping characteristic of said active valve damper based on said value of said repeating pattern to develop a modified set of operational values for said at least one damping characteristic of said active valve damper, said sensor data receiver configured to repeatedly receive said sensor data at a pre-defined time interval, said sensor data evaluator configured to:
   repeatedly determine an acceleration magnitude from said repeatedly received sensor data;
   repeatedly determine a real time power spectral density (PSD) from said repeatedly received sensor data;
   compare said acceleration magnitude with a pre-defined threshold value to obtain an acceleration magnitude comparison value;
   compare said PSD with said pre-defined threshold value to obtain a PSD comparison value; and
   modify said modified set of operational values for said at least one damping characteristic of said active valve damper based upon at least one of said acceleration magnitude comparison value or said PSD comparison value.

2. The system of claim 1 further comprising:
   a sensor data storage configured to store said received sensor data from said one or more sensors monitoring said vehicle.

3. The system of claim 1 further comprising:
   a performance data storage configured to store said present set of operational values for said at least one damping characteristic of said active valve damper and said modified set of operational values for said at least one damping characteristic of said active valve damper.

4. The system of claim 1 further comprising:
   an active suspension adjustor to communicate with said active valve damper, said active suspension adjustor to automatically monitor said at least one damping characteristic of said active valve damper, and automatically send an adjustment command to said active valve damper, said adjustment command comprising said modified set of operational values.

5. The system of claim 1 further comprising:
   said sensor data evaluator configured to:
   modify said present set of operational values for said at least one damping characteristic of said active valve damper to said less than pre-defined threshold value set of operating values for said at least one damping characteristic of said active valve damper.

6. The system of claim 1 further comprising:
   said sensor data evaluator configured to:
   modify said present set of operational values for said at least one damping characteristic of said active valve damper to said greater than or equal to pre-defined threshold value set of operating values for said at least one damping characteristic of said active valve damper;
   upon a determination that both said acceleration magnitude and said PSD are less than said pre-defined threshold value, obtain a less than said pre-defined threshold value set of operating values for said at least one damping characteristic of said active valve damper; and
   modify said present set of operational values for said at least one damping characteristic of said active valve damper to said less than said pre-defined threshold value set of operating values for said at least one damping characteristic of said active valve damper.

7. The system of claim 1 further comprising:
   said sensor data evaluator configured to:
   repeatedly utilize an acceleration data from said repeatedly received sensor data to repeatedly determine a derivative of acceleration (Jerk);
   repeatedly apply a variance approach to said Jerk to detect a rapid change in said acceleration data;
   repeatedly access a number of pre-identified Jerk signatures that have been previously associated with different types of terrain;
   repeatedly compare said Jerk with said number of pre-identified Jerk signatures to identify a best match pre-identified Jerk signature;
   repeatedly obtain a terrain appropriate set of operating values for said at least one damping characteristic of said active valve damper based on said terrain associated with said best match pre-identified Jerk signature;
   compare said present set of operational values for at least one damping characteristic of said active valve damper with said terrain appropriate set of operating values for said at least one damping characteristic of said active valve damper; and
   modify, as necessary, said present set of operational values for said at least one damping characteristic of said active valve damper to said terrain appropriate set of operating values for said at least one damping characteristic of said active valve damper.

8. The system of claim 1 further comprising:
   said sensor data evaluator configured to:
   repeatedly determine a noise floor frequency value from said repeatedly received sensor data, said noise floor frequency value being an averaged value determined over a predefined period of time;
   obtain a pre-defined bump threshold value;
   modify said pre-defined bump threshold value with said noise floor frequency value to obtain a modified pre-defined bump threshold value;
   repeatedly obtain a bump value from said received sensor data;
   repeatedly compare said bump value with said modified pre-defined bump threshold value;
   upon a determination that said bump value is greater than or equal to said modified pre-defined bump threshold value, obtain a greater than or equal to bump threshold value set of operating values for said at least one damping characteristic of said active valve damper;
   modify said present set of operational values for said at least one damping characteristic of said active valve damper to said greater than or equal to bump threshold value set of operating values for said at least one damping characteristic of said active valve damper; and upon a determination that said bump value is less than said modified pre-defined bump threshold value, obtain a less than bump threshold value set of operating values for said at least one damping characteristic of said active valve damper; and modify said present set of operational values for said at least one damping characteristic of said active valve damper to said less than bump threshold value set of operating values for said at least one damping characteristic of said active valve damper.

9. The system of claim 1 further comprising:
said sensor data evaluator configured to:
automatically send an adjustment command to said active valve damper, said adjustment command comprising an adjustment to said modified set of operational values for said at least one damping characteristic of said active valve damper.

10. The system of claim 1 further comprising:
said sensor data evaluator configured to:
repeatedly monitor said acceleration magnitude and said PSD to determine how both said acceleration magnitude and said PSD are related to said pre-defined threshold value;
upon a determination that both said acceleration magnitude and said PSD are greater than or equal to said pre-defined threshold value, obtain a greater than or equal to pre-defined threshold value set of operating values for said at least one damping characteristic of said active valve damper; and
modify said at least one damping characteristic of said active valve damper to said greater than or equal to pre-defined threshold value set of operating values for said at least one damping characteristic of said active valve damper.

11. The system of claim 1 further comprising:
said sensor data evaluator configured to:
repeatedly monitor said acceleration magnitude and said PSD to determine how both said acceleration magnitude and said PSD are related to said pre-defined threshold value;
upon a determination that both said acceleration magnitude and said PSD are less than said pre-defined threshold value, obtain a less than pre-defined threshold value set of operating values for said at least one damping characteristic of said active valve damper; and
modify said at least one damping characteristic of said active valve damper to said less than pre-defined threshold value set of operating values for said at least one damping characteristic of said active valve damper.

12. The system of claim 1 further comprising:
said sensor data evaluator configured to:
repeatedly utilize a real-time fast Fourier transform to calculate a frequency from said repeatedly received sensor data;
repeatedly access a number of pre-identified frequency signals that have been previously associated with different types of terrain;
repeatedly compare said calculated frequency with said number of pre-identified frequency signals to identify a best match pre-identified frequency signal; and modify said modified set of operational values for said at least one damping characteristic of said active valve damper based upon said best match pre-identified frequency signal.

13. A system comprising:
a sensor data receiver configured to receive sensor data from one or more sensors monitoring a vehicle;
a sensor data evaluator configured to:
identify a repeating pattern in said sensor data, said repeating pattern indicative of a terrain type being traversed by said vehicle;
determine a value of said repeating pattern;
obtain a present set of operational values for at least one damping characteristic of an active valve damper coupled with said vehicle;
modify said present set of operational values for said at least one damping characteristic of said active valve damper based on said value of said repeating pattern to develop a modified set of operational values for said at least one damping characteristic of said active valve damper,
automatically send an adjustment command to said active valve damper, said adjustment command comprising said modified set of operational values for said at least one damping characteristic of said active valve damper, said sensor data receiver configured to repeatedly receive said sensor data at a pre-defined time interval, said sensor data evaluator configured to:
repeatedly determine a noise floor frequency value from said repeatedly received sensor data, said noise floor frequency value being an averaged value determined over a predefined period of time;
obtain a pre-defined bump threshold value;
modify said pre-defined bump threshold value with said noise floor frequency value to obtain a modified pre-defined bump threshold value;
repeatedly obtain a bump value from said received sensor data;
repeatedly compare said bump value with said modified pre-defined bump threshold value;
upon a determination that said bump value is greater than or equal to said modified pre-defined bump threshold value, obtain a greater than or equal to bump threshold value set of operating values for said at least one damping characteristic of said active valve damper;
modify said present set of operational values for said at least one damping characteristic of said active valve damper to said greater than or equal to bump threshold value set of operating values for said at least one damping characteristic of said active valve damper;
upon a determination that said bump value is less than said modified pre-defined bump threshold value, obtain a less than bump threshold value set of operating values for said at least one damping characteristic of said active valve damper; and
modify said present set of operational values for said at least one damping characteristic of said active valve damper to said less than bump threshold value set of operating values for said at least one damping characteristic of said active valve damper.

14. A system comprising:
a sensor data receiver configured to receive sensor data from one or more sensors monitoring a vehicle;

a sensor data evaluator configured to:
  identify a repeating pattern in said sensor data, said repeating pattern indicative of a terrain type being traversed by said vehicle;
  determine a value of said repeating pattern;
  obtain a present set of operational values for at least one damping characteristic of an active valve damper coupled with said vehicle;
  modify said present set of operational values for said at least one damping characteristic of said active valve damper based on said value of said repeating pattern to develop a modified set of operational values for said at least one damping characteristic of said active valve damper;
  automatically send an adjustment command to said active valve damper, said adjustment command comprising said modified set of operational values for said at least one damping characteristic of said active valve damper, said sensor data receiver configured to repeatedly receive said sensor data at a pre-defined time interval, said sensor data evaluator configured to:
    repeatedly utilize an acceleration data from said repeatedly received sensor data to repeatedly determine a derivative of acceleration (Jerk);
    repeatedly apply a variance approach to said Jerk to detect a rapid change in said acceleration data;
    repeatedly access a number of pre-identified Jerk signatures that have been previously associated with different types of terrain;
    repeatedly compare said Jerk with said number of pre-identified Jerk signatures to identify a best match pre-identified Jerk signature;
    repeatedly obtain a terrain appropriate set of operating values for said at least one damping characteristic of said active valve damper based on said terrain associated with said best match pre-identified Jerk signature;
  compare said present set of operational values for at least one damping characteristic of said active valve damper with said terrain appropriate set of operating values for said at least one damping characteristic of said active valve damper; and
  modify, as necessary, said present set of operational values for said at least one damping characteristic of said active valve damper to said terrain appropriate set of operating values for said at least one damping characteristic of said active valve damper.

* * * * *